UNITED STATES PATENT OFFICE.

CHARLES S. VADNER, OF SALT LAKE CITY, UTAH.

PROCESS FOR THE RECOVERY OF METALS FROM ORES AND THE LIKE.

1,144,402. Specification of Letters Patent. Patented June 29, 1915.

No Drawing. Application filed June 16, 1914. Serial No. 845,483.

*To all whom it may concern:*

Be it known that I, CHARLES S. VADNER, a citizen of the United States, and a resident of Salt Lake City and county, Utah, have discovered a new and useful Process for the Recovery of Metals from Ores and the like, of which the following is a specification.

The recovery of iron from ores and various products that are finally rejected as slag or otherwise in various smelting operations and the possibility of working large deposits of low grade copper ores containing more or less iron, together with little or no silver and gold, provided some physical assistance or financial reimbursement could in some way finally be derived from such a recovery, would certainly be a welcomed addition to the metallurgical practice of the country.

It is well known that a large tonnage of iron is daily used as a flux at the various smelting concerns throughout the United States, and that such iron is finally thrown away in the form of a slag containing besides the necessary iron purchased either in the form of "scrap" or as high grade iron ore, some little copper, silver, zinc, possibly a very little gold and in case of lead smelters a small percentage of lead; other metals such as arsenic, cadmium, bismuth, etc., may also be found, so that any percentage of recovery of the above named metals that could be made at a profit either from slag dump, as above mentioned, or from low grade ores containing copper and iron and possibly some other values, would necessarily be worthy of metallurgical attention.

The fact that it is proposed to treat slag dumps and low grade copper or copper iron deposits—material, in fact, that thus far has been rejected or thought impossible to utilize—necessarily means, that ways and means heretofore unknown or unused must be applied or such ways and means must be used in combination with the reclamation or utilization of waste products that have heretofore been permitted to go to waste, whether such waste products were merely a source of waste; that no method was known whereby a saving of same could be made at a financial profit and no further damage was sustained by its loss, or whether said waste, besides being a loss in itself, inflicted serious inconvenience and damage upon the person and property of unwilling victims. Special reference is made to the emission of sulfurous gases from various smelting operations and the financial losses that are being sustained both by the smelters in question, who are permitting these noxious gases to escape, and by the unwilling victims in attempting to defend themselves and their property. Wherefore, I propose utilizing the sulfurous gases emitted from smelting works or any industry that produces sulfurous gases or even the production of sulfurous gases by burning sulfur or otherwise, for the reclamation of iron from slag dumps or other ores, as may be. I do not merely wish to limit myself to the recovery of iron, as other metals are found associated more or less with iron such as gold, silver, copper, lead, bismuth, cadmium, arsenic, antimony, zinc, lime; in fact all the present known metals that can be recovered by the proposed process and the recovery of which would be a source of profit in addition to the objective ends of the application of the process.

Various suitably pulverized smelter slags, and ores containing gold, silver, lead, bismuth, cadmium and antimony, are exposed in the presence of heat, which is either artificially generated or abstracted from the slag by using same while in a heated condition to hot sulfurous gases either from smelters or artifically generated.

The suitably pulverized slags and ores are preferably showered or sprayed down towers up which the said gases are made to pass, or otherwise exposed to the solvent action of said sulfurous gases in the presence of heat and moisture a sufficiently long period of time for the purpose of effecting the solution of the metal and metals that it is desired to extract. This operation can be performed over a sump, so that the solvent action can be prolonged until the desired results are obtained, any method of carrying on this operation as will best suit in each particular case will necessarily be installed.

In certain instances, particularly where copper, zinc, silver and gold are sought to be extracted, the addition of soluble chlorids, one or more, the presence of which favors the solution of the above enumerated metals in the sulfurous solution, either by their own solvent powers or due to their presence in preventing secondary reactions from taking place that would tend to render the operation of the process more expensive, or in some cases, prohibitive, is desirable, and when found to be necessary, is made. I would not desire to limit myself to the above enumerated metals, but would use a solution of the soluble chlorids containing at least one of the common chlorids capable of reacting with the metals, such as sodium chlorid, magnesium chlorid, calcium chlorid, ferrous and ferric chlorid and cuprous and cupic chlorid in operating the process, either in the commencement of same, or at any state, where the use of said chlorid and chlorids could be advantageously used in the extraction of any and all of the aforesaid metals from their ores.

I intend to use any one of the soluble chlorids, either singly or in combination, that are capable of reacting with the metals for the purpose of preventing a secondary reaction and a precipitation of metal.

The solution of the ore as may be, having been satisfactorily accomplished by means of sulfurous gases as aforementioned either with or without the use of one or more of the soluble chlorids mentioned above, is separated from the insoluble residue by decantation or filtration into suitable containers and the excess of sulfurous gases are gotten rid of, either by heat, steam or air, and the surplus acidity of the solution due to acid salts, free acid or otherwise, neutralized partially or wholly as may be necessary, with the carbonates, oxids or hydrates of calcium, magnesium, sodium, potassium or with a mixture of same as may be possible.

When iron is present, the solution is first partially neutralized and oxidized or not, as desired, with air, chlorin or any other suitable oxidizing agent. The solution, hot or cold, is then exposed in any suitable manner to the action of air or oxygen; the iron contained in said solution can thus be partially or wholly precipitated as a brownish red pulverulent powder $Fe_2O_3$ (ferric oxid), at will by the operator, simply by regulating: 1st, the acidity of the solution; 2nd, the length of time of the treatment of the solution with air or oxygen; 3rd, the degree of strength of the solution of the soluble chlorids, especially while using sodium chlorid, calcium chlorid or a mixture of the soluble chlorids; 4th, the temperature of the solution; 5th, the condition of the iron after it has been leached out of the ore and while in the leaching medium. Thus, $$2FeSO_3 + SO_2 + O = Fe_2(SO_3)_3$$
Ferrous sulfite — Ferric sulfite $$Fe_2(SO_3)_3 = Fe_2O_3 + 3SO_2$$

The neutralizing agent added takes no part in the reaction, merely reducing the acidity of the solution thus:

$$SO_2 + H_2O + CaCO_3 = CaSO_3 + CO_2 + H_2O.$$

Freshly precipitated ferric oxid is soluble in moderately strong acid solution, hence the necessity of reducing the acidity in order to obtain the precipitate.

In case that the ores used contain arsenic and it is desired to eliminate and recover the arsenic, a different form of precipitating the iron is used. The solution of the ore is effected and the excess of $SO_2$ gas is gotten rid of as above mentioned and the solution is oxidized or not, as may be desired, by a suitable oxidizing agent and the iron is precipitated as ferric hydrate $Fe_2(OH)_6$ by the addition of a sufficient amount of neutralizing agent or agents (or a combination of same) such as the oxids, carbonates or hydrates of barium, calcium, strontium, magnesium, sodium, potassium or a mixture of same can also be used. When the iron is precipitated in this form, the ferric hydrate $Fe_2(OH)_6$ formed has the power of uniting with the arsenic present and forming either ferric arsenite or ferric arsenate as may be, which is precipitated and removed by filtration and other suitable ways from the solution.

Antimony, silver, gold, lead, bismuth, cadmium and other known metals that would be found dissolved in such a solution, depending of course on the contents of the ore and ores being treated, can be precipitated as above described and recovered if found to be desirable. This method of eliminating and purifying the solution of any and all undesirable metals as aforementioned, can be used, whether the iron is eliminated and recovered by the first or second mentioned method, and also when a combination of the two methods is necessary to effect an elimination of the above mentioned metals for the purpose of purifying the solution. It is well understood that any and all steps in this process can be carried out in the presence of heat or cold, as may be most advantageous. Copper can also be eliminated by passing the solution, hot or cold, in any suitable manner over metallic iron. The condition of the solution as to the amount of free acid and state of oxidization can be regulated to suit the best purpose of the application of the process. The copper and silver can also be precipitated as a basic carbonate by the suitably pulverized carbonate of the alkalies, alkaline earth or a mixture of same with or without the use of air and in the cold.

The precipitate is separated by filtration and other suitable means and the copper, silver and other contained metals as may be, are recovered by electrolyzing the hot or cold solution, in suitable containers. The excess acidity of the solution, due to the decomposition of the sulfites, is gotten rid of both by heat and also by the carbonates of the metals, alkalies, alkaline earths or a mixture of same used in effecting the precipitation of the copper. Sulfites are formed which may precipitate out of the solution and which can be separated, and $SO_2$ gas and their valuable basic contents recovered therefrom. A current of air will also assist in reducing the acidity of the solution. The formation of calcium sulfate due to oxidation is effective in reducing said acidity, and any such sulfate formed can be separated and recovered for use.

It is my intention of effecting the functioning of this process for the purpose of cheapness of operation by, 1st, using $SO_2$ gas and water; 2nd, using $SO_2$ gas, water and heat; 3rd, using $SO_2$ gas, water and a soluble chlorid or a mixture of soluble chlorids as aforementioned, along with heat when necessary; or using the above means in part, together or in combination, also using the soluble chlorids mentioned in part, together or in combination for the purpose of extracting the metals aforementioned.

The strength of the solution in soluble chlorids will vary from 5% to 20% as may be.

The solution being freed from the aforementioned metals as may be and in the manner described for the best purpose of the application of the process, the zinc is precipitated from the cold solution by means of the suitably pulverized neutralizing agent, such as oxid, carbonates, hydrates, of barium, calcium, strontium, magnesium, sodium, potassium. A mixture of same can be used, and the basic precipitate of zinc is separated by filtration or otherwise and calcined to the oxid, smelted or dissolved in any suitable manner in a solution of $SO_2$ and water with or without heat and electrolyzed in any suitable manner, whereby the zinc is recovered in metallic form.

The precautions for the removal of the acidity of the solution and recoveries of the by-products, as in the elimination of copper, should be duly observed.

Copper, arsenic, antimony, bismuth, lead, cadmium, mercury, tin, gold and silver can also be precipitated from an acid solution, as sulfids, by a suitable precipitant as $H_2S$ and the like, and are termed precipitable metals under this condition. Copper can also be precipitated by passage over iron, the precipitated metals being eliminated, the solution containing the iron, zinc, nickel, cobalt, manganese, that are not precipitable by $H_2S$ in an acid solution, is treated as aforementioned, for the precipitation of iron as a precipitable metal (i. e., one that can be precipitated under these conditions) the solution can be hot or cold.

The precipitated metals are eliminated, the hot solution is neutralized as beforementioned, air is passed through and zinc is precipitated as a basic compound and under these conditions is termed precipitable metal.

Copper can be precipitated from a cold sulfite solution containing common soluble chlorids as aforementioned, as a basic compound, by passing air through the solution, and would be termed precipitable metal under this condition.

The $SO_2$ gas is eliminated as before mentioned and reused along with water, or with barren solution in regenerating the solution, for the leaching of more ore and repeating the cycle of solution, precipitation and regeneration until the metallic contents of the ore is sufficiently exhausted.

Having thus described my process what I claim is:

1. The process of extracting iron from mineral matter and the like which consists in treating the mineral matter with $SO_2$ gas in the presence of moisture, leaching the iron from the mineral matter, sufficiently neutralizing the solution; passing air through same, thereby precipitating the iron as ferric oxid, eliminating the precipitated ferric oxid, and recovering the iron.

2. The process of extracting iron from mineral matter and the like which consists in treating the mineral matter with $SO_2$ gas in the presence of moisture, leaching the iron from the mineral matter, partially neutralizing the solution with a suitable neutralizing agent; passing air through the solution, thereby partially precipitating the iron as ferric oxid, adding sufficient additional neutralizing agent, whereby the passage of more air through the solution completely precipitates the iron as ferric oxid, eliminating the ferric oxid and recovering the iron.

3. The process of extracting iron from mineral matter and the like which consists in treating the mineral matter with $SO_2$ gas in the presence of moisture, leaching the iron from the mineral matter, partially neutralizing the solution with a suitable neutralizing agent; passing air through the solution, thereby partially precipitating the iron as ferric oxid, adding sufficient additional neutralizing agent, whereby the passage of more air through the solution completely precipitates the iron as ferric oxid.

4. The process of extracting iron from mineral matter and the like which consists in treating the mineral matter with $SO_2$ gas in the presence of moisture, leaching the iron from the mineral matter, partially neutralizing the solution with a suitable neutralizing agent; passing air through the solution, thereby precipitating iron as ferric oxid.

5. The process of extracting iron from mineral matter and the like which consists in treating the mineral matter with $SO_2$ gas in the presence of moisture, leaching the iron from the mineral matter, eliminating excess of $SO_2$ gas by suitable means, sufficiently neutralizing the solution with a suitable neutralizing agent, whereby passing air through the solution completely precipitates the iron as ferric oxid.

6. The process of extracting iron from mineral matter and the like which consists in treating the mineral matter with $SO_2$ gas in the presence of moisture, leaching the iron from the mineral matter, eliminating excess of $SO_2$ gas by suitable means, passing air through the solution, thereby precipitating the iron as ferric oxid, eliminating the ferric oxid and recovering the iron.

CHARLES S. VADNER.

Witnesses:
 JAS. BANKHEAD,
 E. C. ALLEN.